Dec. 17, 1940.     W. B. GOODMAN     2,225,109
AIRCRAFT PROPELLER DRIVE
Filed Nov. 4, 1938
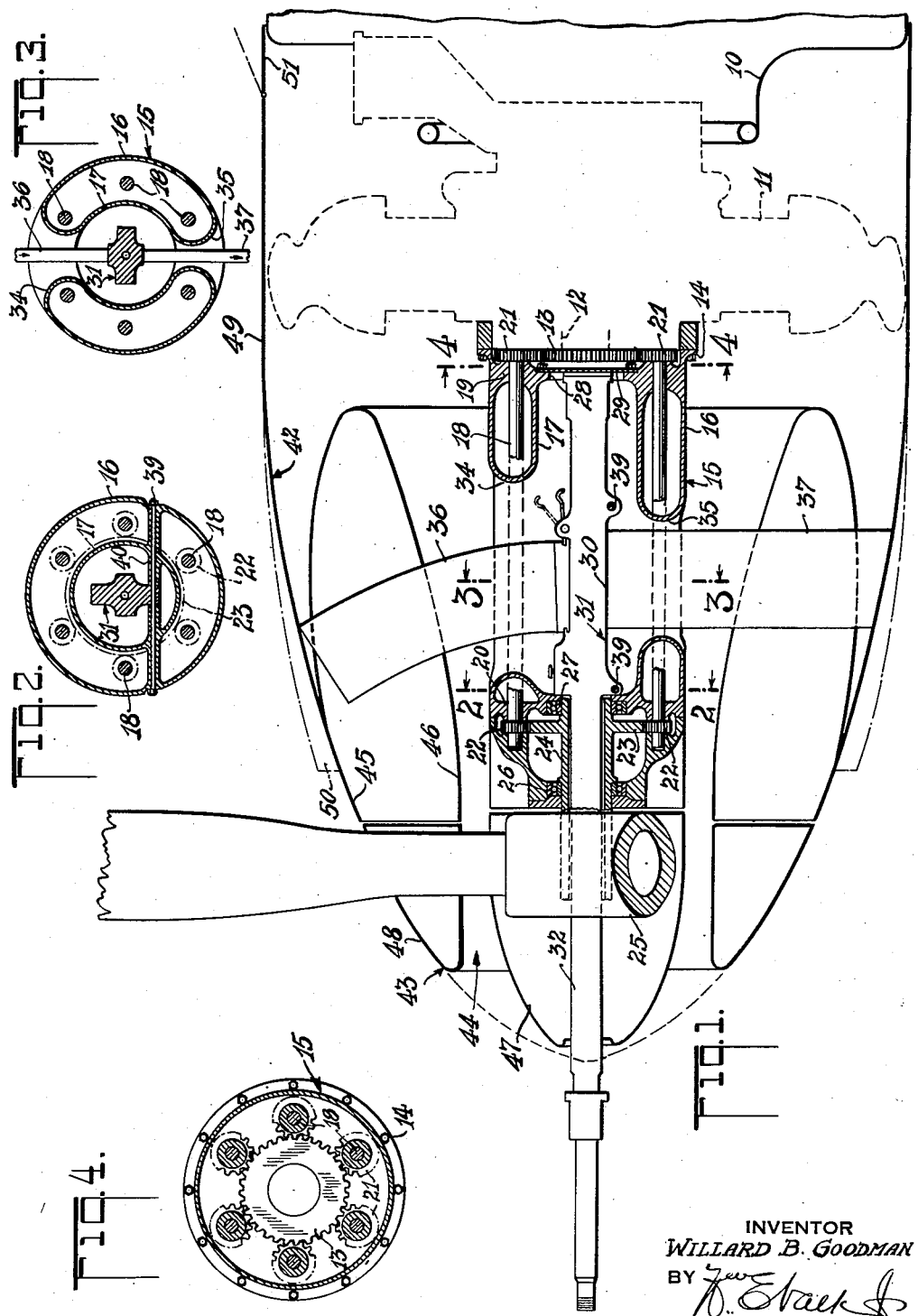
INVENTOR
WILLARD B. GOODMAN
BY
ATTORNEY Patented Dec. 17, 1940

2,225,109

UNITED STATES PATENT OFFICE 2,225,109

AIRCRAFT PROPELLER DRIVE

Willard B. Goodman, Radburn, N. J., assignor to Wright Aeronautical Corporation, a corporation of New York Application November 4, 1938, Serial No. 238,731

3 Claims. (Cl. 244—60)

This invention relates to improvements in aircraft armament, and more particularly provides a coordinated power plant for aircraft incorporating a gun.

In military aircraft it has long been the practice to mount fixed machine guns so that they fire through the propeller disc, suitable synchronizing mechanism being provided so that the bullets issuing from the gun do not hit the propeller blades. As the art has developed, a need has become apparent for the use of guns of larger caliber which necessarily become heavier and have a greater force of recoil. Coincidentally, the heavier guns or light cannon should be mounted close to the axis of symmetry of the airplane to avoid poor weight distribution and to avoid instability of the aircraft which might result from placing the guns remotely with respect to the axis of symmetry or the thrust axis of the plane.

In this respect, the art suggests the use of guns mounted between the cylinder rows of a V-type engine wherein the gun barrel projects through a geared propeller shaft, wherefor no synchronizing mechanism is necessary, and whereby the recoil force of the gun is directly upon the thrust axis of the propeller. However, with the present wide use of radial cylinder engines, the above indicated solution for the problem is unsatisfactory, for the engine structure does not permit of reduction gears and gun placement in favorable positions. Accordingly, it is an object of this invention to provide means by which a gun may be mounted upon the thrust axis of a propeller which is concentric with and is driven by a radial cylinder engine.

A further object is to provide an improved type of extension drive for an engine of high power, which is light in weight and which is not subject to the limitations which have been common to remote drives of the art.

A further object is to provide an improved form of cowling and cooling system for a power plant which is equipped with a remotely driven propeller and a concentric gun installation.

Still another object is to provide a remote drive system between an engine and propeller, all of the elements of the power plant being rigidly associated with one another.

A further object is to provide, between an engine and a driven propeller rigidly connected to one another, a cell or space concentric with the propeller shaft within which a gun or other armament may be disposed so that the reaction of the gun, when operated, is directly along the thrust axis. In connection with the gun mounting, a further object is to provide means for obtaining access to the gun and to provide loading and unloading mechanism therefor which is accessible from the exterior of the power plant.

Further objects will be apparent from a reading of the annexed specification and claims, and from an examination of the drawing, in which:

Fig. 1 is a longitudinal section through a portion of the improved power plant structure, showing certain of the components thereof diagrammatically; and Figs. 2, 3 and 4 are, respectively, sections on the lines 2—2, 3—3 and 4—4 of Fig. 1.

In the drawing, 10 represents the forward portion of an aircraft body, such as a nacelle or fuselage, upon which an engine 11 is secured. The power plant as shown incorporates an engine of the radial cylinder air-cooled type which is shown diagrammatically, and which is mounted upon the structure 10. This engine has the conventional concentric power shaft 12 upon which is mounted, exteriorly of the engine, a drive gear 13. To the engine casing, as at 14, is bolted a substantially cylindrical housing 15 provided with an exterior wall 16 and an interior wall 17 whereby the walls define therebetween an annular space, and whereby the wall 17 defines therewithin a cylindrical space. In said annular space are disposed a plurality of circumferentially spaced shafts 18 borne at their ends in suitable bulkheads 19 and 20, the right hand end of each shaft having thereon a pinion 21 meshing with the gear 13. At their left hand ends, the shafts 18 carry pinions 22 meshing with a gear 23 rigid with a hollow propeller shaft 24 on which is mounted a propeller 25. The shaft 24 is borne in bearings 26 and 27 carried by the housing 15. The rear end of the housing 15 per se is open as at 28, but is covered by a detachable plate 29 to protect the gears 13, 21. The gears 22, 23 are confined within the forward portion of the housing 15, which may be detachable. Within the cylindrical space defined by the wall 17 of the housing 15 is disposed the breach portion 30 of a gun or cannon 31, the barrel 32 thereof projecting forwardly through the hollow propeller shaft 24. The proportions of the drive assembly will be such as to accommodate the particular type of gun or cannon which is to be used, the particular gun shown being a known type of 20 m. m. rapid fire cannon. It is contemplated that machine guns of .30 or .50 inch caliber, or rapid fire cannons of 20 to 37 m. m. caliber may readily be utilized in a device of this kind.

The housing 15 is provided with access openings 34 and 35, disposed between adjacent pairs of layshafts 18, to allow for the installation of a cartridge feed chute 36 and a cartridge discharge chute 37. Obviously, the chute 36 may be loaded from above without in any way interfering with the power plant installation per se. The opening 28 at the rear of the housing 15 is of sufficiently large size to permit of rearward withdrawal of the gun 31 after the housing 15 has been removed from the engine and the cover plate 29 removed from the housing. Supports for the gun 31 are provided in the form of trunnions 39 carried by bosses 40 integral with the housing 15.

In referring to Fig. 4, in connection with Fig. 1, it will be noted that the gears 13, 21 comprise a step-up transmission whereby the several shafts 18 will be rotated at several times engine speed. The ratio of the gears 22, 23 will be such as to provide a step-down gear of suitable ratio so that the propeller is driven either at engine speed or at less than engine speed. Thus, the gear and layshaft organization may readily comprise a propeller reduction gear, replacing the propeller reduction gear normally incorporated in the engine per se. The transmission organization is highly efficient from power capacity and weight standpoints, for the layshafts 18 being plural in number divide engine power and due to high speed are subject to considerably less torque than if they were driven at engine speed. Thus, the aggregate group of shafts 18 may be much lighter in weight than a single transmission shaft running at engine speed. Due to the relatively large diameter of the housing 15, it possesses inherent rigidity so that, by its rigid mounting to the engine and to the propeller assembly, the whole power plant becomes an integral and rigid unit.

The power plant incorporating the extension housing 15 lends itself to very favorable streamlining and to greater propeller efficiency, for, as indicated, the contour of cowling 42 may be tapered forwardly of the engine to provide a virtually perfect streamline nose. The propeller 25 preferably carries a spinner 43 forming a forward streamline continuation of the cowling 42 and having, at its forward end, a central air entrance opening 44 into which cooling air for the engine may be entrained. The cowling 42 actually comprises two parts, including a forward fixed portion 45 which includes an inner air directing portion 46 cooperating in the definition of an annular air entrance space with the housing 15. The propeller carries an inner spinner 47 forming a streamlined nose for the housing 15 and cooperating with the outer spinner 48 which carries out the streamline of the cowling 45. The rear part 49 of the cowling 42 comprises an axially slidable portion movable to a position such as that shown in dotted lines to define an auxiliary cooling air entrance annulus 50, adapted for use at low flight speeds and in climb. The cowl 49, at its trailing edge, is provided with adjustable flaps 51 to vary the cooling air exit opening between cowling and body, these flaps being coincidentally actuated by axial movement of the cowl 49.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In an aircraft power plant, an engine having a short projecting power shaft and a gear mounted thereon, an elongated substantially cylindrical housing comprising outer and inner concentric walls providing between said walls an elongated annular chamber and providing within the inner wall a hollow space, said housing being secured to the engine with the outer wall thereof clearing and embracing said gear, a plurality of circumferentially disposed layshafts in said chamber and carried by the housing, each having a pinion engaging said engine gear, a hollow shaft propeller journalled at the end of said housing remote from the engine, the shaft hollow communicating with said hollow space, and means to drive said propeller from said layshafts.

2. In an aircraft power plant, an engine having a short projecting power shaft and a gear mounted thereon, an elongated substantially cylindrical housing comprising outer and inner concentric walls providing between said walls an elongated annular chamber and providing within the inner wall a hollow space, said housing being secured to the engine with the outer wall thereof clearing and embracing said gear, a plurality of circumferentially disposed layshafts in said chamber and carried by the housing, each having a pinion engaging said engine gear, a hollow shaft propeller journalled at the end of said housing remote from the engine the shaft hollow communicating with said hollow space, and means to drive said propeller from said layshafts, said outer and inner walls having openings to provide access to said hollow space between the engine and propeller, and partitions between the walls around the openings to isolate and seal said chamber from the hollow space and from the outside of the housing.

3. In an aircraft power plant, an engine having a projecting power shaft, a housing comprising concentric cylindrical walls secured to the engine over said shaft, the walls defining an annular chamber therebetween and a clear hollow space within the inner wall, a propeller journalled on the housing and having a hollow shaft the hollow of which opens to said hollow space, a plurality of layshafts circumferentially disposed in said annular chambers, means driving said layshafts from the engine shaft, and means driving the propeller from said layshafts.

WILLARD B. GOODMAN.